(12) United States Patent
Cabada

(10) Patent No.: US 11,407,356 B1
(45) Date of Patent: Aug. 9, 2022

(54) LED ASSEMBLY FOR USE IN A VEHICLE AS A U-TURN SIGNAL INDICATOR

(71) Applicant: Juan Cabada, Miramar, FL (US)

(72) Inventor: Juan Cabada, Miramar, FL (US)

( * ) Notice: Subject to any disclaimer, the term of this patent is extended or adjusted under 35 U.S.C. 154(b) by 0 days.

(21) Appl. No.: 17/142,938

(22) Filed: Jan. 6, 2021

Related U.S. Application Data

(60) Provisional application No. 62/957,385, filed on Jan. 6, 2020.

(51) Int. Cl.
| | |
|---|---|
| *B60Q 1/34* | (2006.01) |
| *B60R 1/12* | (2006.01) |
| *B60Q 1/30* | (2006.01) |
| *B60Q 1/26* | (2006.01) |
| *F21V 23/00* | (2015.01) |
| *F21S 43/14* | (2018.01) |
| *F21Y 105/18* | (2016.01) |
| *F21Y 115/10* | (2016.01) |

(52) U.S. Cl.
CPC ............ *B60Q 1/34* (2013.01); *B60Q 1/2696* (2013.01); *B60Q 1/30* (2013.01); *B60R 1/1207* (2013.01); *F21S 43/14* (2018.01); *F21V 23/003* (2013.01); *B60Q 2400/20* (2013.01); *F21Y 2105/18* (2016.08); *F21Y 2115/10* (2016.08)

(58) Field of Classification Search
CPC .......... B60Q 1/34; B60Q 1/2696; B60Q 1/30; F21S 43/14; B60R 1/1207; F21V 23/003
USPC ....................................................... 340/475
See application file for complete search history.

(56) References Cited

U.S. PATENT DOCUMENTS

| | | | |
|---|---|---|---|
| 4,994,786 A | | 2/1991 | Schaffer |
| 5,086,289 A | | 2/1992 | Sullivan et al. |
| 5,663,708 A | | 9/1997 | Strawn |
| 5,680,100 A | | 10/1997 | Millsap |
| 5,731,755 A | * | 3/1998 | Boxer .................... B60Q 1/26 340/465 |
| 6,195,001 B1 | | 2/2001 | Haddad et al. |
| 7,167,086 B1 | | 1/2007 | Goins |
| 7,218,212 B2 | | 5/2007 | Hu |
| 7,417,534 B2 | | 8/2008 | Quach et al. |
| 8,610,595 B1 | | 12/2013 | Aleteeby |
| 9,643,533 B1 | | 5/2017 | Houss |
| 2005/0083191 A1 | | 4/2005 | Levin |
| 2005/0168347 A1 | * | 8/2005 | Sanicola .................. B60Q 1/50 340/815.45 |
| 2005/0179533 A1 | | 8/2005 | Stevenson |
| 2005/0231347 A1 | | 10/2005 | Company |
| 2005/0237174 A1 | * | 10/2005 | Hu ........................ B60Q 1/34 340/476 |
| 2007/0069881 A1 | | 3/2007 | Dohan |

(Continued)

*Primary Examiner* — Bryon T Gyllstrom
(74) *Attorney, Agent, or Firm* — John Rizvi; John Rizvi, P.A.—The Patent Professor

(57) ABSTRACT

A U-turn signal indicator is provided having an array of light-emitting diodes arranged in a daisy chain configuration to form a ring or loop of lights. The LED ring can be provided as a separate one-piece construction that can be attached to the vehicle at any desired location, such as a side view mirror assembly, headlight, or taillight. Alternately, the LED ring can be integrally manufactured into the target vehicle location. Activation of each LED in sequence generates a pattern of illumination that signifies a U-turn. The existing turn signal switch assembly can be modified to add a functionality that controls the LED activation.

18 Claims, 13 Drawing Sheets

(56) References Cited

U.S. PATENT DOCUMENTS

| | | | |
|---|---|---|---|
| 2007/0132573 A1* | 6/2007 | Quach | B60Q 1/34 340/475 |
| 2007/0184935 A1 | 8/2007 | Wallis et al. | |
| 2014/0091920 A1* | 4/2014 | Thompson | B60Q 1/38 340/475 |
| 2016/0207449 A1* | 7/2016 | Noble | B60Q 1/34 |
| 2016/0318440 A1* | 11/2016 | Salter | B60Q 1/34 |
| 2017/0240098 A1* | 8/2017 | Sweeney | B60Q 1/50 |
| 2019/0299849 A1* | 10/2019 | Dohan | B60Q 1/2657 |

\* cited by examiner

LED ASSEMBLY FOR USE IN A VEHICLE AS A U-TURN SIGNAL INDICATOR

CROSS-REFERENCE TO RELATED APPLICATIONS

This application claims the benefit of U.S. Provisional Patent Application Ser. No. 62/957,385, filed on Jan. 6, 2020, which is incorporated herein in its entirety.

FIELD OF THE INVENTION

The present invention relates generally to turn signal indicators in vehicles, and more particularly, to a light-emitting device having an array of light-emitting diodes arranged in a daisy chain configuration, where the device is integral with the vehicle at an exterior location such as the side view mirror or headlight/taillight assembly, and is activated by the user to illuminate the LEDs in sequence to indicate a U-turn.

BACKGROUND OF THE INVENTION

One may presume safety guidelines for vehicles have always been as rigid as they are today. Unfortunately, that is incorrect, as a brief study of the history of automobiles indicate. Karl Benz manufactured the first vehicle in 1885. Only 24 years later was the turn signal implemented, and only in 1958 was the modern 3-point seatbelt patented by Swedish engineer Nils Bohlin. As popularly dictated, modern automaker's primary fixation is safety—with good reason.

According to the Society of Automotive Engineers, failure to use turning signals accounts for over 2 million accidents annually, whereas distracted driving accounts for 950,000 accidents annually (although this number is increasing dramatically). Moreover, the U.S. Department of Transportation's National Highway Traffic Safety Administration proposed that, in 2008, the number of crashes caused by the making of a U-turn comprised of 0.6% of all crashes. During that year, there were 5,811,000 police-reported motor vehicle traffic crashes, making it likely that U-turns participated in 34,866 crashes that year alone. This number has likely grown significantly over the past decade due to the number of new drivers occupying the streets.

As evidenced, safety innovations are necessary to save the lives of millions of drivers annually. One glaring blind spot to the safety operation of vehicles is its lack of signal indicating a driver intends to make a U-turn. According to Arrive Alive, the U-turn is one of the most dangerous maneuvers performed on roads worldwide. Although the rate of these accidents are lower, their severity far exceeds other kinds of collisions. The deadliness of the U-turn rests on the necessity of the driver to, depending on the size of the vehicle, cross multiple lanes to execute it correctly. This substantially increases the chances that, if a collision does occur, it is either a run-under or a side impact collision, two devastating possibilities among many others. To make matters worse, the consequences of these collisions are accentuated by the likelihood of involving multiple vehicles and blocking traffic altogether.

U-turns are also susceptible to rear-end collisions since the speed of the maneuver is inevitably slower than if the driver intends to make a left or right turn across an intersection. This is particularly problematic during poor weather conditions, where the vehicle's speed needs to decrease remarkably. Although turning signals can alert others of the driver's intention of turning, it fails to differentiate between the two drastically different turns. Another poorly reasoned solution to preventing U-turn accidents was the decision to make them illegal in numerous turns and intersections. This hampers traffic fluidity and fails to prevent collisions from occurring in the millions of other intersections where U-turns are still legal. In fact, providing vehicles with U-turn signals may legalize the maneuver in intersections where it was previously illegal, thus promoting more efficient traffic management.

Other means of mitigating the hazard of U-turns include the construction of unusable lanes to increase the line of sight of the vehicles crossing the intersection. As one can imagine, this is a lengthy and extremely costly construction process and still does not solve the problem of vehicles being rear-ended during the U-turn. Therefore, an accessible and practical solution to attenuate the risk of U-turns will inevitably save the lives of hundreds of thousands of drivers and dramatically reduce the cost that comes with traffic accidents.

Accordingly, there is an established need for a signaling device that overcomes the limitations of signaling devices and the associated problems that remain unsolved.

SUMMARY OF THE INVENTION

The present invention is directed to at least one light-emitting component each configured at a visible exterior location of a vehicle and operable to transmit a specific pattern of light emissions as a U-turn signal indicator. In one form, the light-emitting component includes a plurality of light-emitting diodes arranged in a daisy chain configuration. The LEDs are activated in sequence, generating a pattern of visible light illumination that signifies a U-turn.

Introducing a first embodiment of the invention, the present invention consists of a signaling device for use with a vehicle. The device comprises at least one light-emitting component each including a respective plurality of light sources. The device further comprises at least one assembled installation each defining a respective light-emitting component disposed at a respective vehicle location.

In a second aspect, the plurality of light sources may include a plurality of light-emitting diodes.

In another aspect, the vehicle location may include one of a side view mirror assembly, a front headlight assembly, a turn signal assembly, and a tail light assembly.

In another aspect, each plurality of light sources may be arranged in a respective daisy chain configuration.

In another aspect, the plurality of light sources may include a first set of light-emitting diodes (LEDs) and a second set of light-emitting diodes (LEDs). Additionally, the vehicle location includes a side view mirror assembly having a mirror disposed in a housing. The first set of LEDs are attached in a generally circumferential pattern to the mirror of the side view mirror assembly and facing generally towards the rear of the vehicle, while the second set of LEDs are attached to an outer surface of the housing and facing generally towards the front of the vehicle. In one form, the device includes at least one loop strip each having a first layer with an adhesive surface contacting one of the housing outer surface and mirror, and further having a second layer disposed on the first layer and carrying a respective one of the first and second set of LEDs.

In another aspect, the device may include a controller configured to selectively control operation of the light-emitting component. According to one operating mode, the controller activates sequential illumination of the light sources to indicate a U-turn. In one exemplary form, the vehicle turn signal controller is adapted to include a functionality that enables user control of the light-emitting component.

In another aspect, the plurality of light sources of a respective light-emitting component may be integrally formed with one of the lens of a vehicle headlight assembly, the lens of a vehicle tail light assembly, the lens of a vehicle turn signal assembly, the mirror of a vehicle side view mirror assembly, and an outer surface of the housing of a vehicle side view mirror assembly.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed towards a U-turn signal indicator installed in a vehicle and implemented in two versions, one where the U-turn signal indicator is added to the vehicle in a retrofit configuration and another where the U-turn signal indicator is a built-in component incorporated into the vehicle during manufacturing. In one form, the U-turn signal indicator is composed of an array of light-emitting diodes arranged in a loop or ring to trace out a daisy chain configuration. Activation of each LED in sequence around the daisy chain provides a pattern of illumination that signifies a U-turn. Several of these LED array devices can be situated at various exterior vehicle locations visible to oncoming and trailing traffic, such as the side view mirror assembly, front headlight, and rear taillight.

Figure 1:
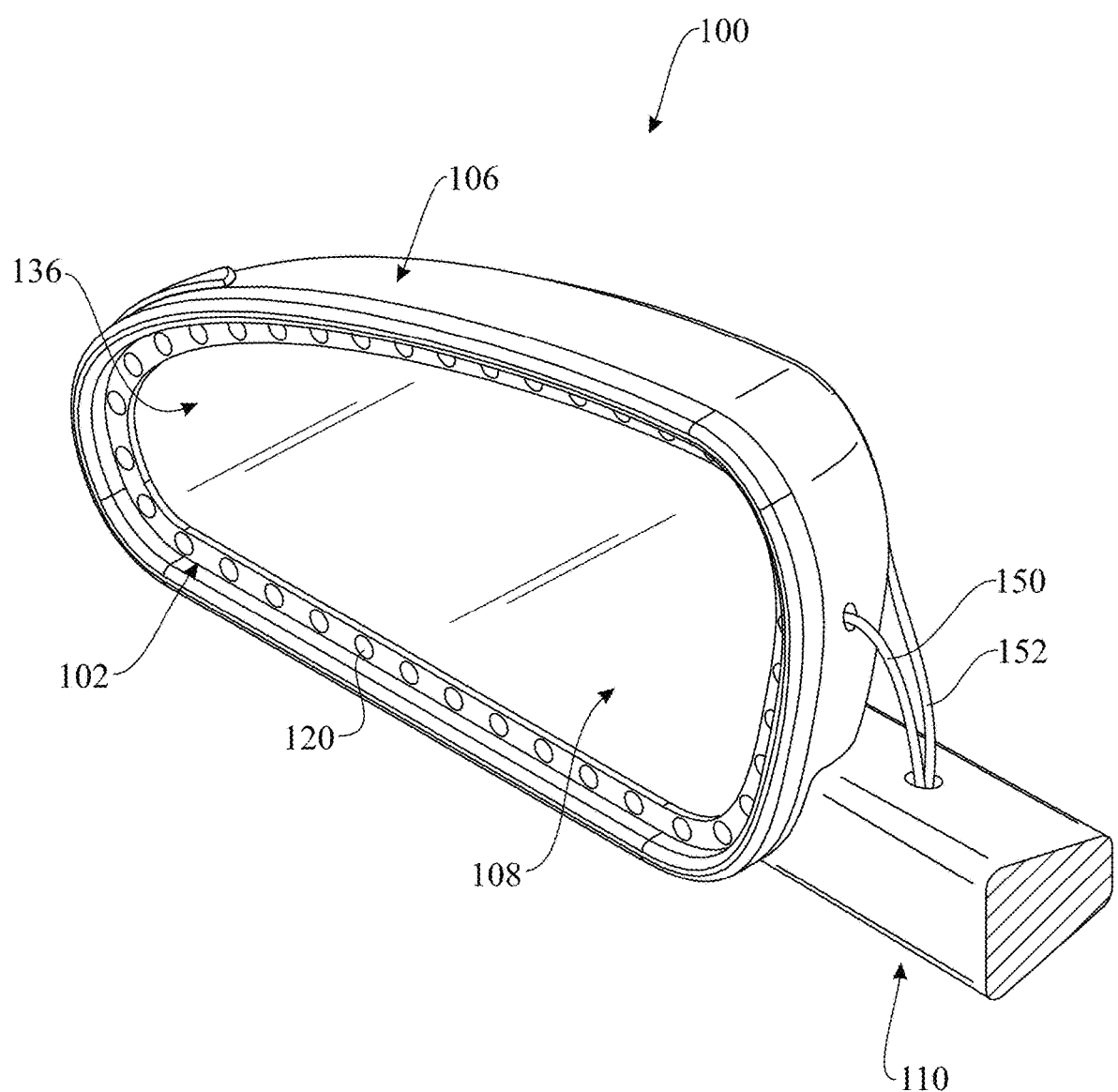
FIG. 1 presents a front perspective view showing a first embodiment of the U-turn signal indicator of the present invention.
Figure 2:
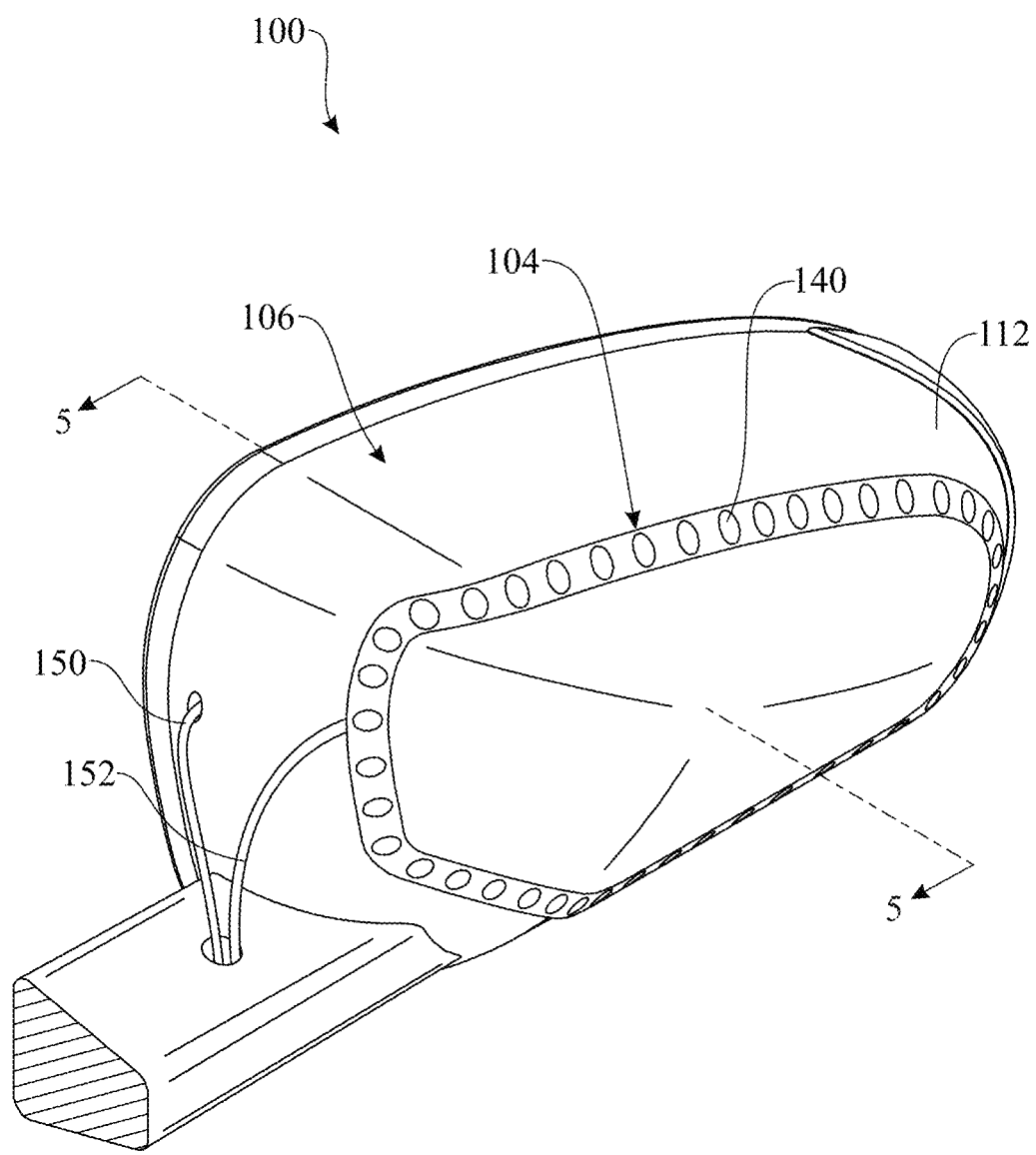
FIG. 2 presents a rear perspective view of the first embodiment of the U-turn signal indicator of the present invention.
Figure 3:
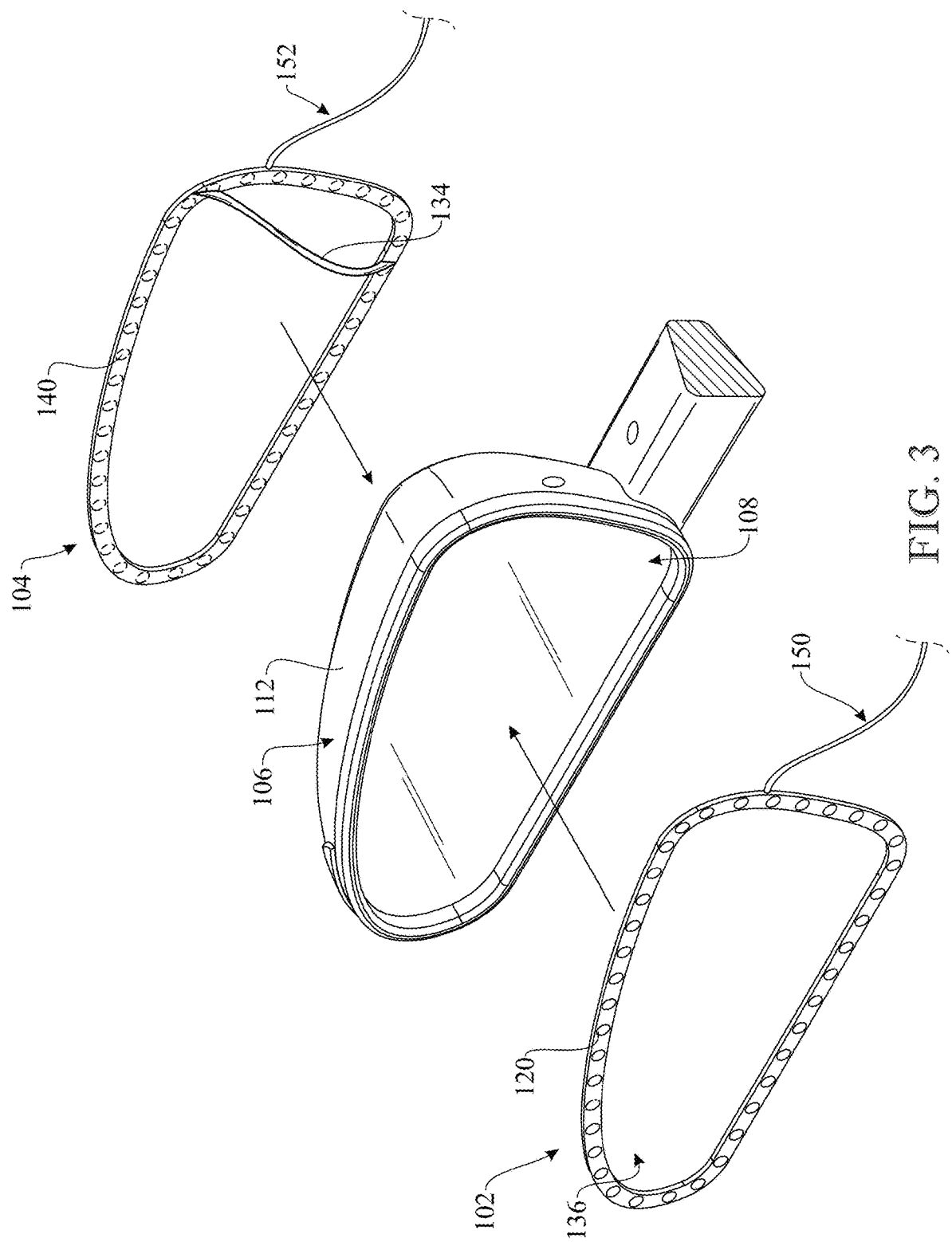
FIG. 3 presents a perspective, exploded view of the first embodiment of the U-turn signal indicator of the present invention.
Figure 4:
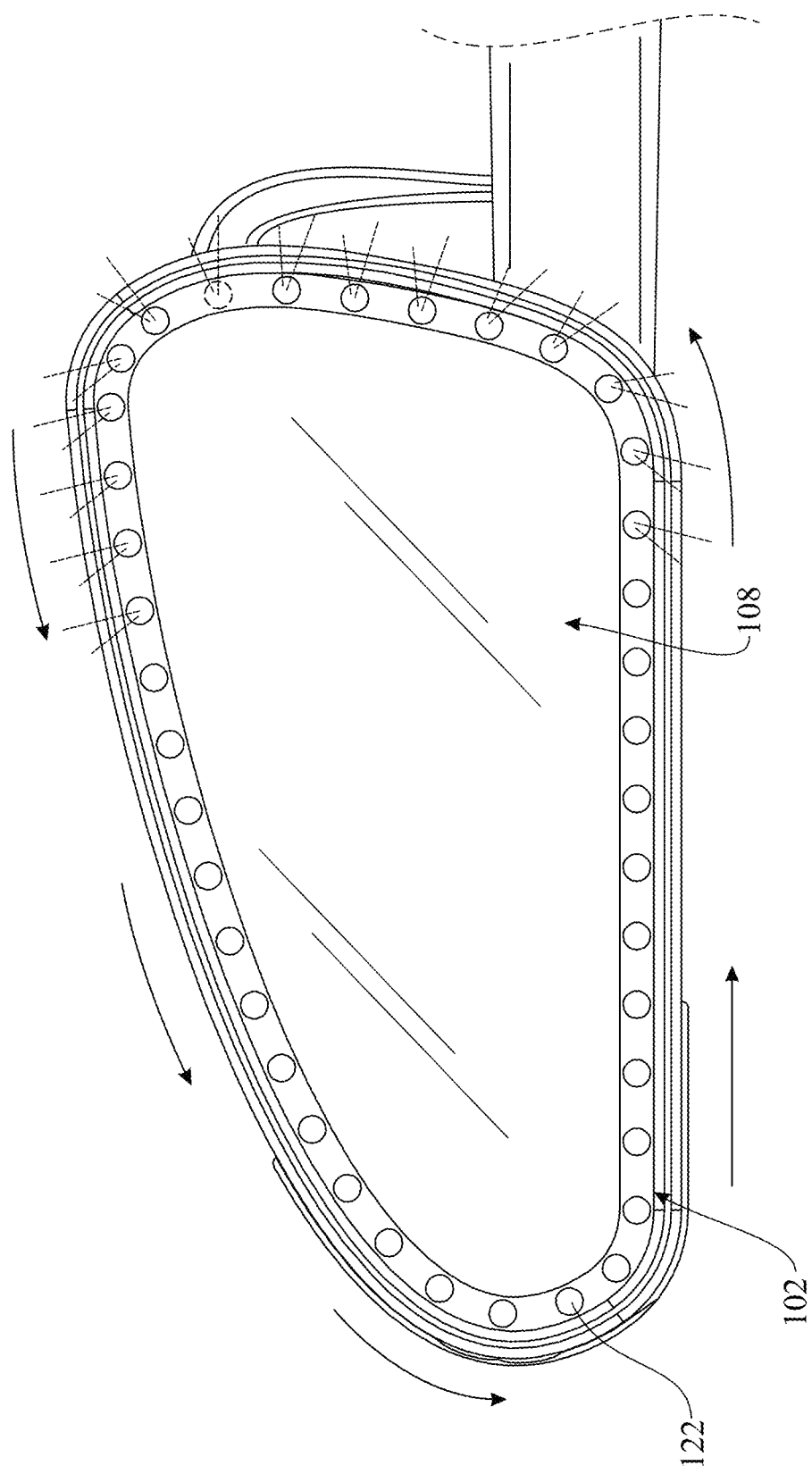
FIG. 4 presents a front planar view of the first embodiment of the U-turn signal indicator of the present invention.

Referring initially to FIGS. 1 through 6, and FIGS. 1-3 in particular, a side view mirror assembly 100 of a vehicle (not shown) includes a first light-emitting device shown generally at 102 (FIG. 1) and a second light-emitting device shown generally at 104 (FIG. 2), according to a first embodiment of the present invention. The side view mirror assembly 100 has a conventional construction and includes a housing 106 containing a mirror 108. As shown in FIG. 3, the combination of first light-emitting device 102 and second light-emitting device 104, each preferably formed as a one-piece construction, are attached to side view mirror assembly 100 at generally opposite locations. In particular, the first light-emitting device 102 is attached to mirror 108 (thus facing towards the rear of the vehicle), and the second light-emitting device 104 is attached to housing 106 (thus facing towards the front of the vehicle). An arm-like bracket or support shown generally (and partially) at 110 attaches or mounts the combination of housing 106 and mirror 108 to the vehicle body, in a conventional manner. As discussed further, the combination of first light-emitting device 102 and second light-emitting device 104 operates as a U-turn signal indicator.

Figure 5:
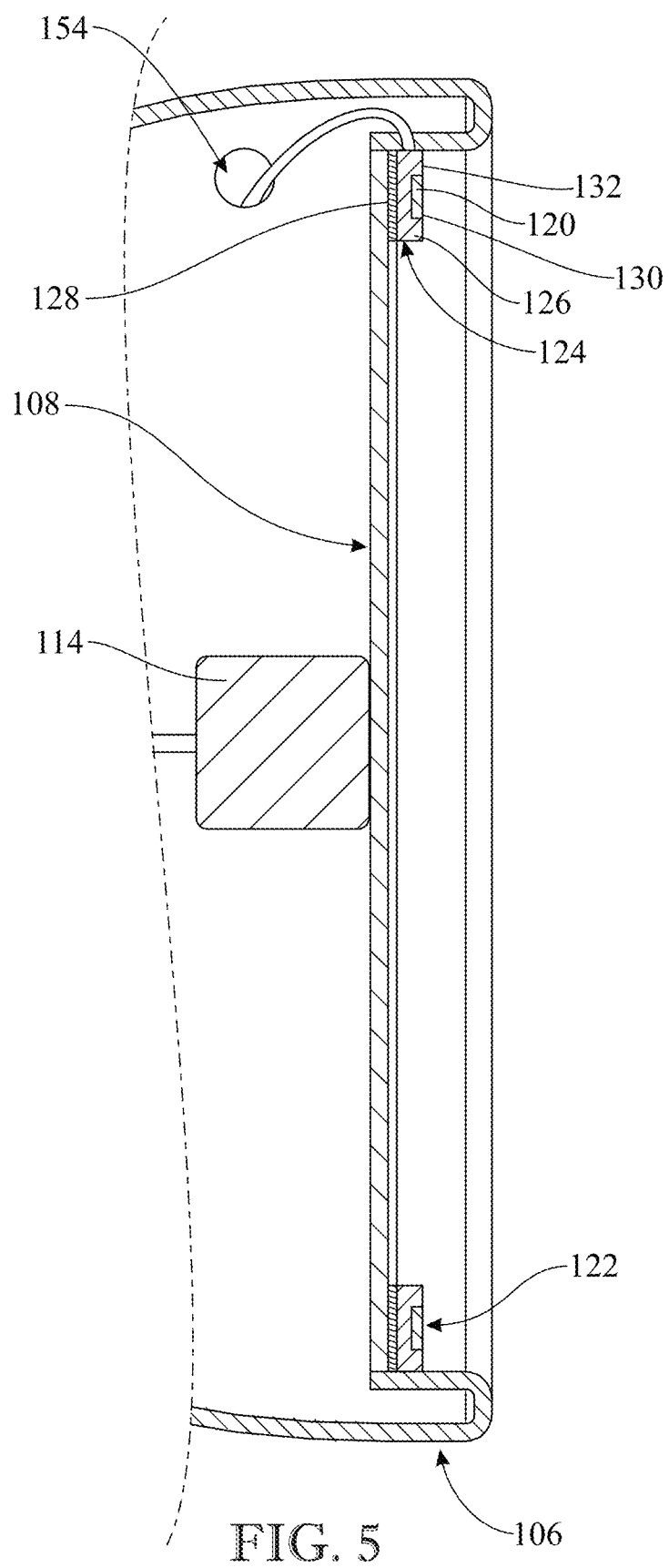
FIG. 5 presents a cross-sectional plan view of the first embodiment of the U-turn signal indicator of the present invention, taken along the horizontal plane defined by lines 5-5 in FIG. 2 and illustrating attachment of the LED components to the mirror of the side view mirror assembly.

Referring to FIGS. 3 and 5, with continuing reference to FIGS. 1 and 2, the first light-emitting device 102 includes an array of individual light sources 120 such as light-emitting diodes (LEDs). The LEDs 120 are spaced-apart and arranged serially in a ring-like fashion to form a loop or closed circuit having the overall form of a strip, band or string of lights, as shown generally by 136 (FIG. 3). The multiple-LED light strip 136 is a separate, one-piece construction that is capable of being attached to a desired vehicle location (e.g., side view mirror assembly). In one form, the array of LEDs 120 is arranged in a daisy chain configuration. The daisy chain configuration defines a wiring scheme in which multiple devices (LEDs 120) are wired together in sequence, forming a ring in this embodiment. As discussed further, in operation, the LEDs 120 are activated in sequential order, with each LED 120 illuminating for a brief duration during its turn in the activation cycle (i.e., each LED 120 blinks or flickers on momentarily, then switches off). The array of LEDs 120 lights up one at a time in sequence, producing the effect or appearance of a running light moving in a circular or rotational path (tracing out the loop). The visual effect of activating the LEDs 120 in this manner is to provide a signal indicator representative of a U-turn. In particular, the pattern of illumination that results from activating each LED in sequence around the daisy chain configuration signifies a U-turn. The array of LEDs 130 of the second light-emitting device 104 (FIG. 2) operates in a similar manner.

Referring to FIG. 5, the first light-emitting device 102 includes a support structure shown generally at 122, for purposes of locating, holding, and otherwise carrying the array of LEDs 120 and for securely attaching device 102 to mirror 108. The second light-emitting device 104 includes a similar support structure 122 (shown in enlarged section view in FIG. 6). The support structure 122 includes a lower layer or substrate 124 and an upper layer 126 overlying lower layer 124 (which carries LEDs 120). The lower layer 124 includes a bottom surface 128 that defines an adhesive backing area, used during installation as the contact surface to attach device 102 to its target surface. The LEDs 120 are located or embedded in upper layer 126 of support structure 124 in a recessed configuration as shown, preferably so that the exposed, outermost light-emitting surface 130 of each LED 120 is flush with the top surface 132 of upper layer 126.

The composite arrangement of support structure 122 (including the lower adhesive layer 124 and the superimposed, upper layer 126 containing LEDs 120) forms an integral one-piece construction (FIG. 3) having a generally planar structure. As assembled, the adhesive surface 128 of lower layer 124 is protected in a conventional manner by a film covering 134 (FIG. 3). The ring-like or looped form of the first light-emitting device 102 is preferably shaped to conform to the peripheral contour of mirror 108, the target surface of device 102. During installation, the film covering 134 is removed, exposing the adhesive surface 128 of lower layer 124 of LED support structure 122. The first light-emitting device 102 is then affixed to the reflective surface of mirror 108 of side view mirror assembly 100, resulting in the configuration shown in FIG. 1. Any suitable material can be used to construct support structure 122 (layers 124, 126), but preferably it would have a strong durability since the devices 102, 104 are exposed in their installed conditions.

Figure 6:
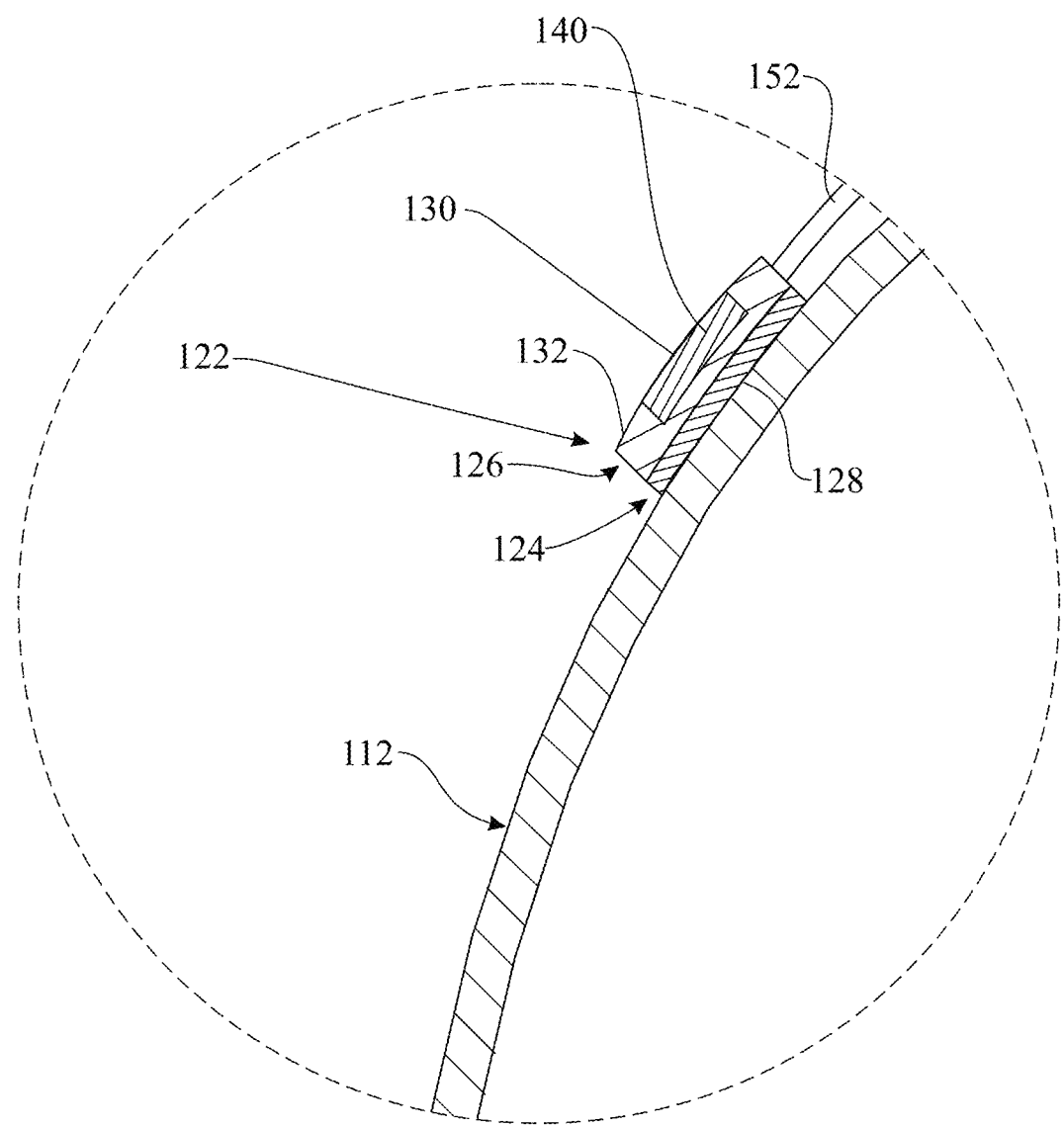
FIG. 6 presents an expanded, partial cross-sectional plan view of the first embodiment of the U-turn signal indicator of the present invention, taken along the horizontal plane defined by lines 5-5 in FIG. 2 and illustrating attachment of the LED components to the back side of the side view mirror assembly.

Referring to FIGS. 2, 3, and 6, the second light-emitting device 104 has a similar construction to first light-emitting device 102 and likewise includes an array of light-emitting diodes 140 preferably arranged in a loop, such as a daisy chain configuration. The ring-like or looped form of the second light-emitting device 104 is preferably shaped to fit onto an exterior surface 112 of housing 106 of side view mirror assembly 100 (FIG. 2), the target surface of device 104. For example, unlike the first light-emitting device 102 that affixes to the flat surface of mirror 108 and is shaped accordingly, the second light-emitting device 104 is affixed to the irregular or curved surface defined by the exterior surface 112 of housing 106 of side view mirror assembly 100. The strip-like configuration of second light-emitting device 104 is appropriately formed to accommodate its placement on the curvature of exterior housing surface 112, as shown in FIGS. 2 and 6.

As shown in FIGS. 1 through 6, an existing side view mirror assembly 100 is retrofit or modified to incorporate first light-emitting device 102 and second light-emitting device 104. In view of its placement on mirror 108, the first light-emitting device 102 is rearward facing and so its illumination is visible to occupants in any vehicle driving immediately behind the vehicle retrofit with device 102. Additionally, in view of its placement on the exterior surface 112 of housing 106 of side view mirror assembly 100, the second light-emitting device 104 is frontward facing and so its illumination is visible to occupants in any vehicles that are approaching from the opposite direction to that of the vehicle retrofit with device 104. In this manner, the combination of first light-emitting device 102 and second light-emitting device 104 permits a user in the retrofit vehicle to provide a signal indicative of a U-turn that is visible to occupants in vehicles both behind and approaching the retrofit vehicle.

In a preferred form, the array of LEDs 120 of first light-emitting device 102 is arranged in a closed-loop, daisy chain configuration. The manner of connecting the array of LEDs 120 in such a daisy chain configuration can be done in a conventional manner. In this preferred form, the array of LEDs 140 of second light-emitting device 104 has a similar daisy chain configuration to that of first light-emitting device 102. In another preferred form, the first light-emitting device 102 and second light-emitting device 104 are commonly controlled by the existing directional signal indicator that controls the turn signaling (i.e., left-turn and right-turn) of the vehicle. For example, in a typical configuration, a turn signal switch has a selection lever mounted on the steering column that the user toggles between different positions (e.g., up or down) to selectively activate either the left-turn or right-turn signal indicator. According to the present invention, this turn signal switch assembly can be modified to incorporate an additional functionality that controls the U-turn signal indicators of the present invention (i.e., first light-emitting device 102 and second light-emitting device 104). For instance, in one exemplary embodiment the turn signal switch may be held in the down or up position for a preprogrammed amount of time (e.g., anywhere between 3 to 5 seconds) to activate emitting devices 102 and 104. In a second exemplary embodiment, the turn signal switch may include an additional pushbutton that may be engaged before the turn signal is pushed in the down or up position to activate emitting devices 102 and 104. If the pushbutton isn't engaged and the turn signal switch is pushed in the down or up position, emitting devices 102 and 104 will not activate. Instead, the vehicle's pre-fabricated left-turn or right-turn indicator will activate.

In such a modification, the switching of devices 102, 104 can be effectuated by a new, additional type of maneuvering of the lever of the turn signal switch assembly (different from that which accomplishes the left and right turn states). The design of such a modification, which incorporates control of the U-turn signal indicators of the present invention into the existing turn signal switch assembly, can be performed in a conventional manner. The connection between the turn signal switch assembly and the combination of the first light-emitting device 102 and second light-emitting device 104 can be accomplished with any suitable wiring, such as connection wiring 150 and 152, respectively. This wiring 150, 152 provides the signal path for powering and switching the array of LEDs 120, 140 of light-emitting devices 102, 104, respectively, using the U-turn control function provided by the turn signal switch assembly operated by the user. The wiring 150, 152 can follow the same routing into the interior of the vehicle as that traversed by the wiring that powers the motor 114 (FIG. 5) to control mirror 108. A set of holes 154 (FIG. 5) can be provided in housing 106 of side view mirror assembly 100 in order to accommodate the routing of wiring 150, 152. Although the illustrative wiring 150, 152 is shown exposed as it exits housing 106 of side view mirror assembly 100, it should be apparent that other routing options are available that would keep wiring 150, 152 hidden from view (e.g., the wiring 150, 152 follows an enclosed path into the vehicle interior).

During operation, when a driver wishes to signal an imminent attempt to initiate a U-turn, the driver appropriately operates the turn signal switch assembly to activate the U-turn signal indicator. In particular, this U-turn signal activation initiates the on/off switching of each LED 120, 140 in sequence in the first light-emitting device 102 and second light-emitting device 104, respectively. The devices 102, 104 operate simultaneously, so that U-turn signaling is communicated rearward (via device 102) and forward (via device 104) at the same time. In device 102, for example, the LEDs 120 are activated (illuminated) one by one in sequential order around the loop (daisy chain configuration), such as the counterclockwise motion indicated in FIG. 4.

The implementation described above operates the LEDs in a one-by-one sequence in order to provide the U-turn signal indication. Each LED is switched on for a transient, predetermined period, then switched off. The control function then advances to the next LED in the sequence and performs the same on/off switching operation. However, this type of LED operation indicative of a U-turn should not be considered in limitation of the present invention but merely illustrative, as other possibilities are available to control the LEDs in a manner representative of a U-turn signal indication, depending on the standard that is adopted to indicate a U-turn. For example, in the daisy chain configuration of the LEDs, another control scheme could maintain each LED in its on state once it is turned on (i.e., it is not turned off before the next LED is turned on), until a full cycle around the daisy chain is complete. After completion of a cycle (at which point the entire LED array is illuminated), all of the LEDs could be switched off and a new cycle begun (i.e., each LED switched on in sequence and kept on). This process continues until the U-turn is terminated (typical to how a left-turn or right-turn works) or the driver disengages the U-turn signal indicator.

Any suitable modification to the existing turn signal indicator can be used to implement the control mechanism for controlling devices 102, 104. For example, in a turn signal switching assembly of the type having a selection lever, the U-turn signal indicator can be activated by holding down the indicator (lever) for a certain amount of time (or, alternately, performing double up/down motions).

Although FIGS. 1 through 6 depict the first and second light-emitting devices 102, 104 installed on a side view mirror, it is also possible to install such a device at other appropriate vehicle locations, such as the headlight(s) or taillight(s). The attachable, one-piece construction of devices 102, 104 makes it possible to place such devices at any desired location on the vehicle.

Figure 7:
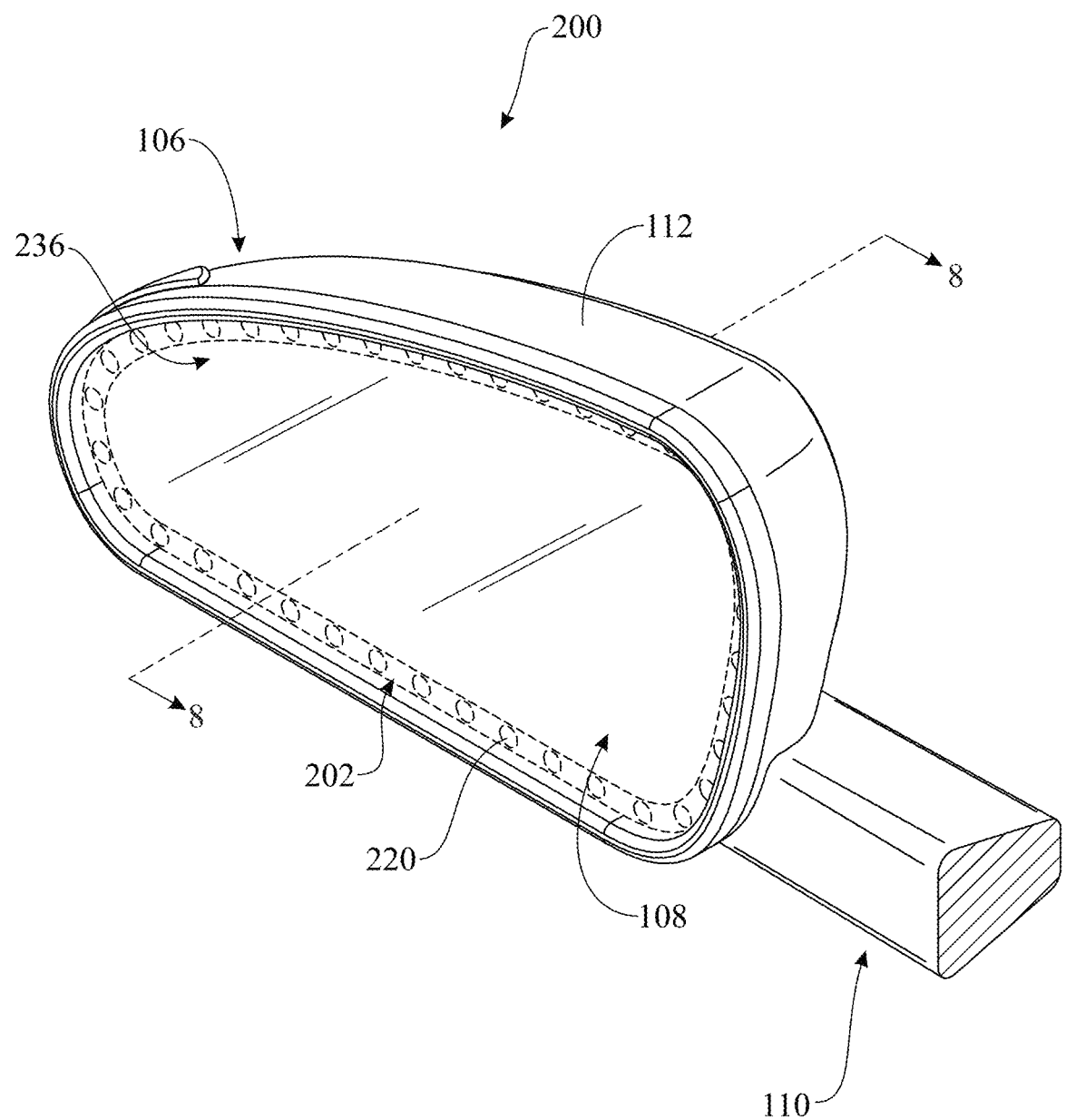
FIG. 7 presents a front perspective view showing a second embodiment of the U-turn signal indicator of the present invention.
Figure 8:
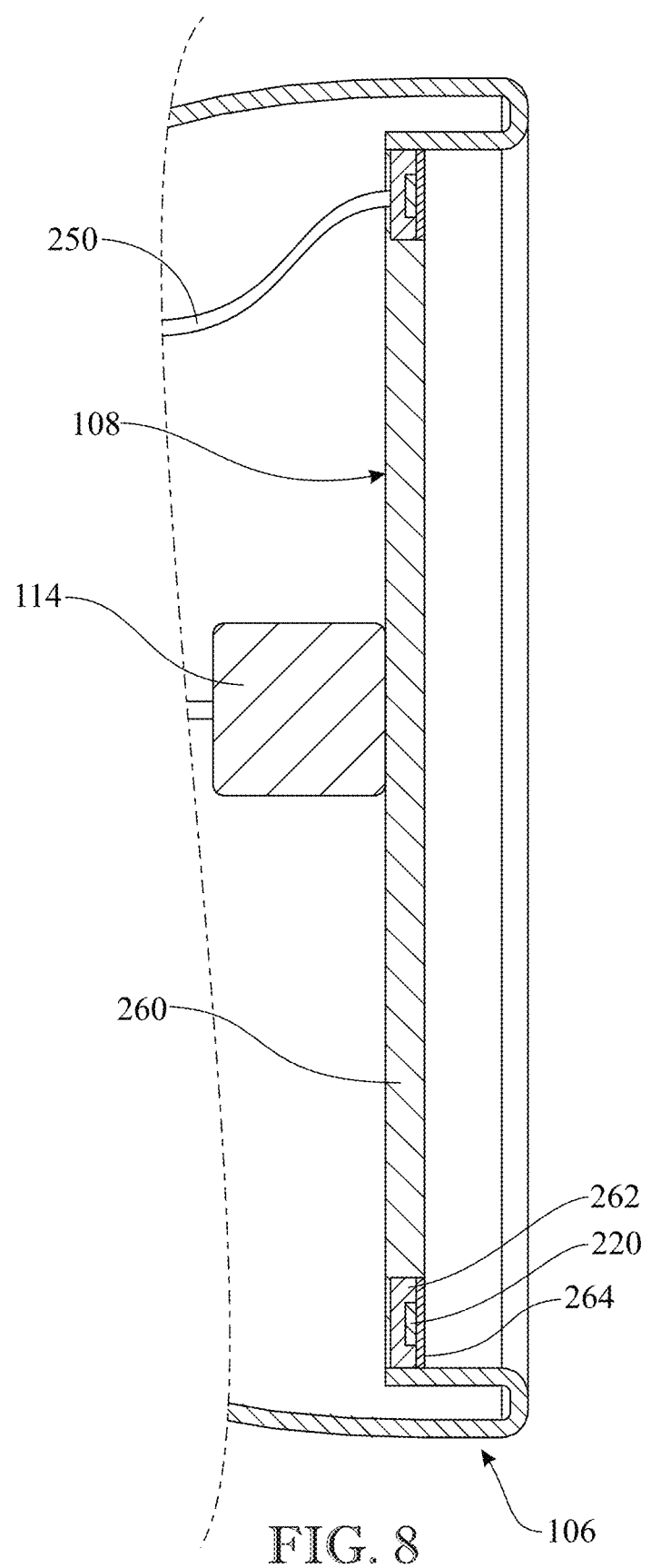
FIG. 8 presents a cross-sectional plan view of the second embodiment of the U-turn signal indicator of the present invention, taken along the horizontal plane defined by lines 8-8 in FIG. 7 and illustrating integral assembly of the LED components into the construction of the mirror of the side view mirror assembly.

Referring now to FIGS. 7 through 10, a side view mirror assembly 200 of a vehicle 300 includes a third light-emitting device shown generally at 202 (FIG. 7), according to a second embodiment of the present invention. Unlike the first embodiment shown in FIGS. 1 through 6, where the first light-emitting device 102 is attached to mirror 108 and the second light-emitting device 104 is attached to housing 106, the second embodiment incorporates the third light-emitting device 202 into mirror 108 as a fabricated, integral piece of it, as best shown in FIG. 8. The third light-emitting device 202 operates as a U-turn signal indicator, in a manner similar to the combination of devices 102, 104 in FIGS. 1 through 6.

Referring now to FIG. 8, the third light-emitting device 202 includes an array of individual light sources 220 such as light-emitting diodes (LEDs). The LEDs 220 are spaced-apart and arranged serially in a ring-like fashion to form a loop or closed circuit shown generally at 236. In one form, the multiple-LED ring 236 is arranged in a daisy chain configuration. The mirror 108 is manufactured to incorporate the array of LEDs 220 into its body 260 at the outer periphery. For this purpose, mirror body 260 is adapted to include a substrate or foundation layer 262 that receives each LED 220 in an embedded, recessed formation. The array of LEDs 220 includes a transparent cover or film 264 that overlies and protects LEDs 220, preferably in a manner that is flush with the reflective surface of mirror 108.

The result of this mirror fabrication process is that the combination of multiple-LED ring 236 and mirror body 260 forms an integral, one-piece construction, where the array of LEDs 220 are embedded or located within the body 260 of mirror 108. Any suitable manufacturing process well known to those skilled in the art can be used to deposit an array of LEDs 220 into the body of mirror 108 in an interconnected, daisy chain configuration. The location of multiple-LED ring 236 is preferably at the periphery of the mirror body 260 in order to minimize interference with the use of the side view mirror for its conventional purposes. In order to establish an electrical connection to the array of LEDs 220, suitable wiring 250 is provided, which is preferably routed through an interior space of housing 106.

The third light-emitting device 202 shown and described in FIGS. 7 and 8 operates similarly to the first light-emitting device 102 and second light-emitting device 104 set forth in FIGS. 1 through 6 according to the first embodiment. In particular, the third light-emitting device 202 operates as a U-turn signal indicator. Its manner of control is likewise similar to that of devices 102, 104 according to the first embodiment.

Figure 9:
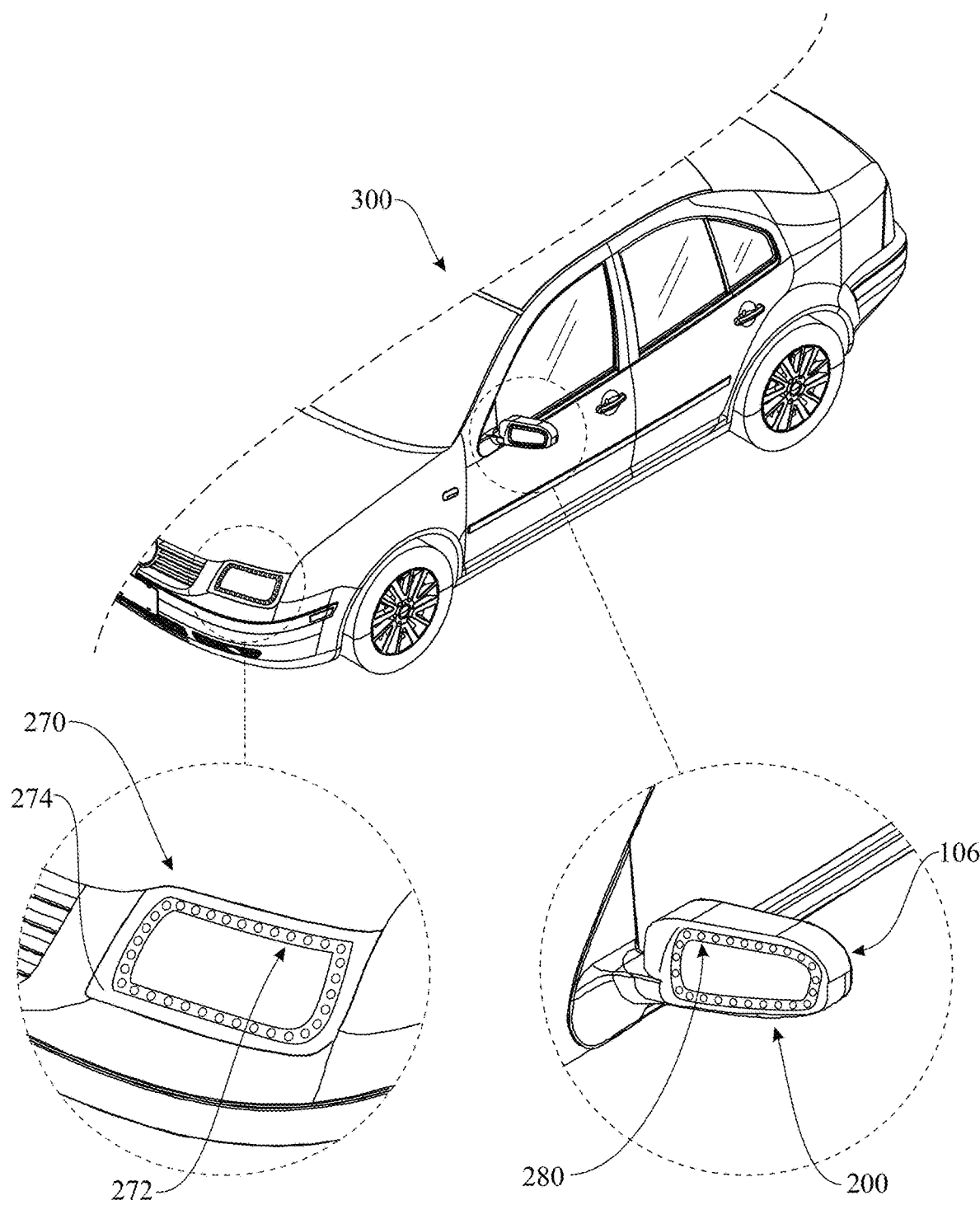
FIG. 9 presents an upper, partial front and side elevation view and an accompanying pair of enlarged views of a front headlight and a side view mirror assembly, showing the second embodiment of the U-turn signal indicator of the present invention.
Figure 10:
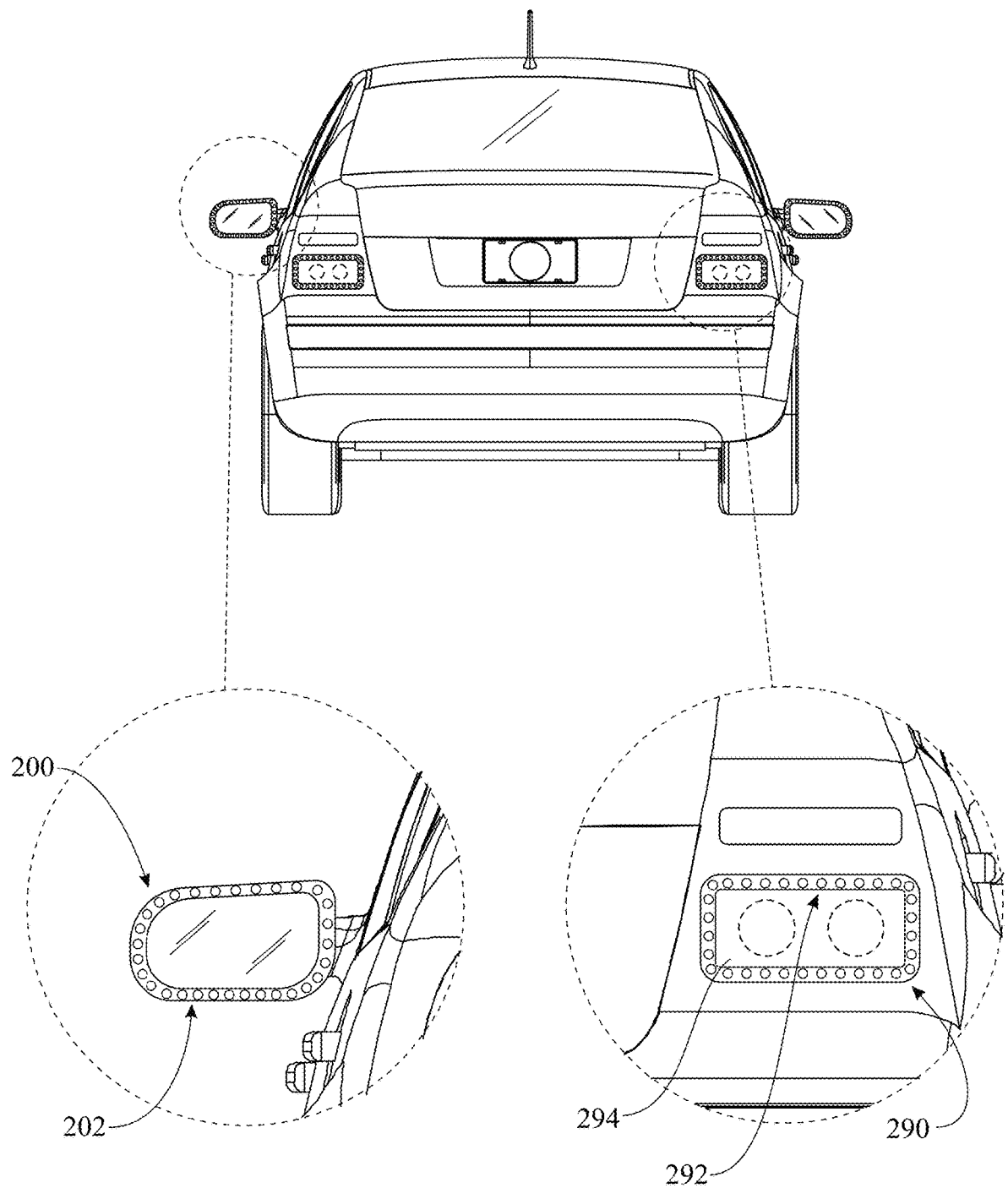
FIG. 10 presents a rear perspective view and an accompanying pair of enlarged views of a taillight and a side view mirror assembly, showing the second embodiment of the U-turn signal indicator of the present invention.

Referring now to FIGS. 9 and 10, various implementations of the second embodiment set forth in FIGS. 7 and 8 are illustrated. FIG. 9 illustrates various car locations where the second embodiment of the present invention can be deployed to act as a notification system for communicating a U-turn signal indication to oncoming traffic. For this purpose, a front headlight assembly 270 can integrally incorporate a light-emitting device 272 into its lens 274 as a one-piece construction, in a manner similar to how the third light-emitting device 202 is integrally incorporated into mirror 108. The headlight-carrying light-emitting device 272 has a similar construction and operation to the mirror-carrying third light-emitting device 202. Additionally, the side view mirror assembly 200 can integrally incorporate a light-emitting device 280 into the front-facing side of its housing 106, in a manner similar to how the third light-emitting device 202 is integrally incorporated into mirror 108. The housing-located light-emitting device 280 has a similar construction and operation to the mirror-carrying third light-emitting device 202. As shown in FIG. 9, the U-turn signal notification to oncoming traffic can occur in tandem at multiple locations (front headlight assembly 270 and side view mirror assembly 200).

FIG. 10 illustrates various car locations where the second embodiment of the present invention can be deployed to act as a notification system for communicating a U-turn signal indication to trailing traffic. The system includes the third light-emitting device 202 integrated into the mirror 108 of side view mirror assembly 200, as set forth in FIGS. 7 and 8. Additionally, a rear taillight assembly 290 can integrally incorporate a light-emitting device 292 into its lens 294 as a one-piece construction, in a manner similar to how the third light-emitting device 202 is integrally incorporated into mirror 108. The taillight-carrying light-emitting device 292 has a similar construction and operation to the mirror-carrying third light-emitting device 202. As shown in FIG. 10, the U-turn signal notification to trailing traffic can occur in tandem at multiple locations (rear taillight assembly 290 and side view mirror assembly 200).

The control of the various light-emitting devices shown throughout FIGS. 7 through 10 can be centralized in the existing turn signal switch assembly, in a manner similar to that described in connection with FIGS. 1 through 6. The second embodiment features the installation of light-emitting devices at various vehicle locations in a ready-made fashion, i.e., the light-emitting devices are built-in components and not add-ons like the first embodiment.

Figure 11:
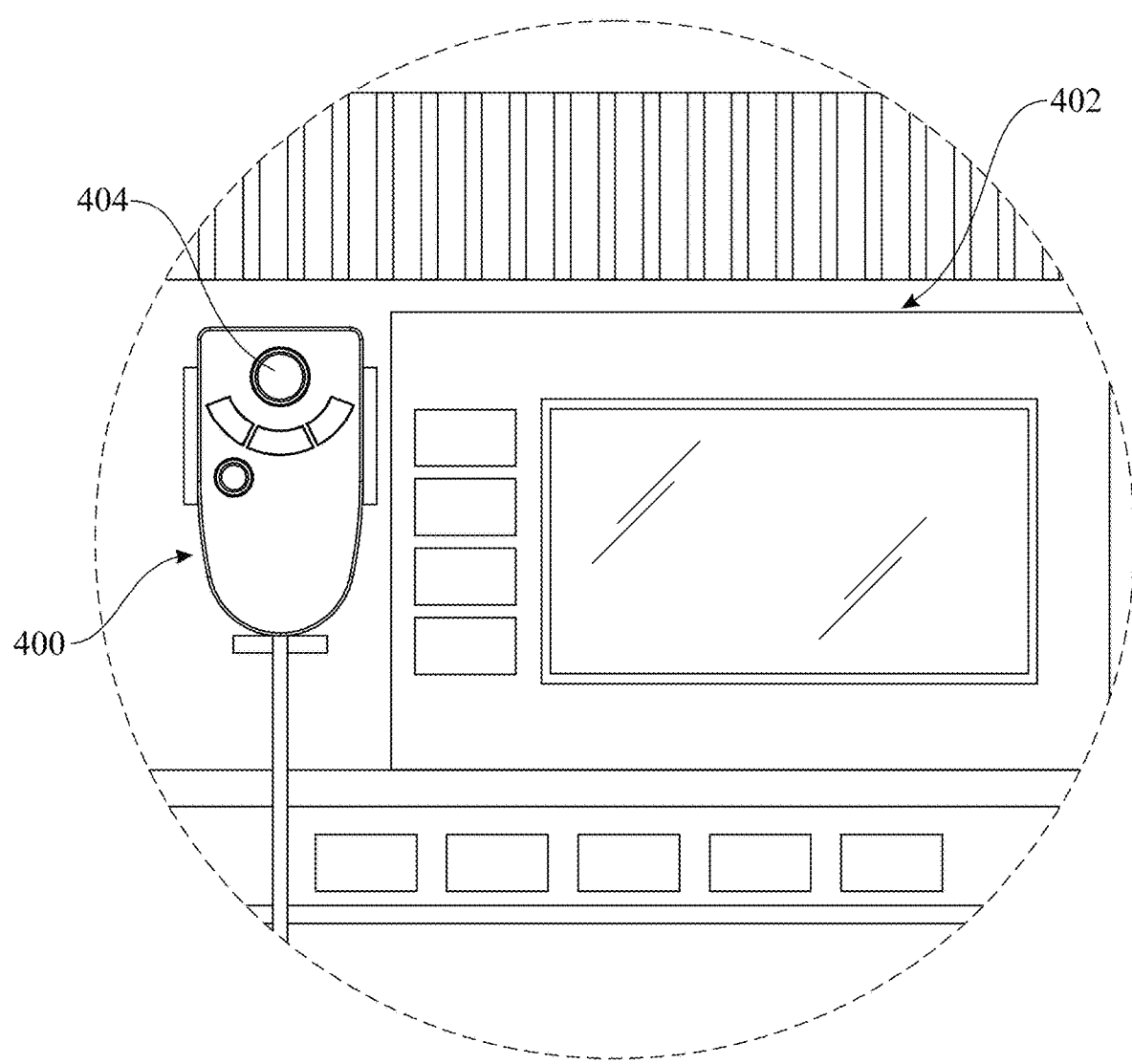
FIG. 11 presents a partial schematic view showing an additional feature for implementing the present invention.
Figure 12:
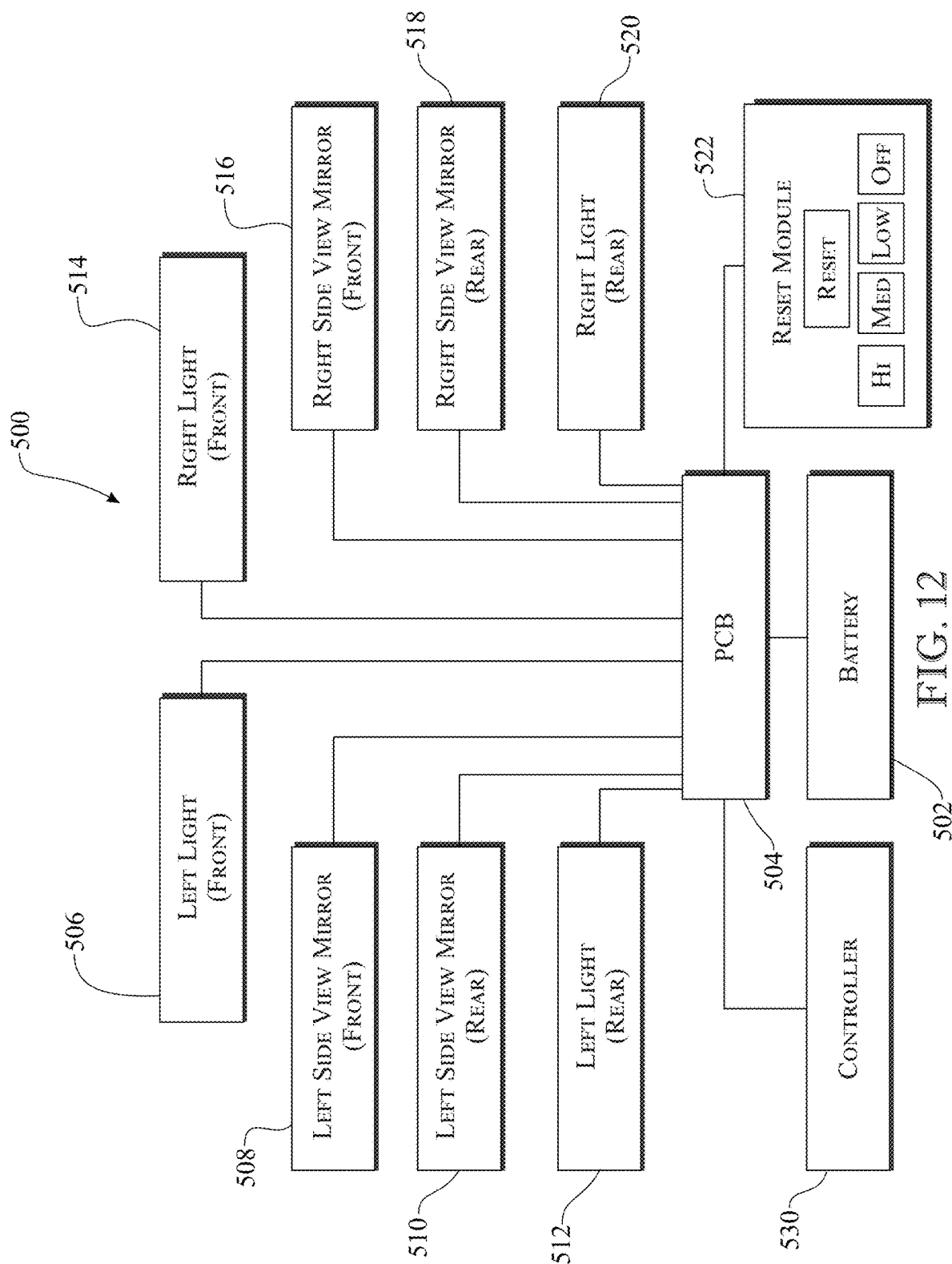
FIG. 12 presents a block diagram showing an integrated system for use as a device controller in connection with the first embodiment (FIGS. 1-6) and the second embodiment (FIGS. 7-10), in combination with the additional feature disclosed in FIG. 11.
Figure 13:
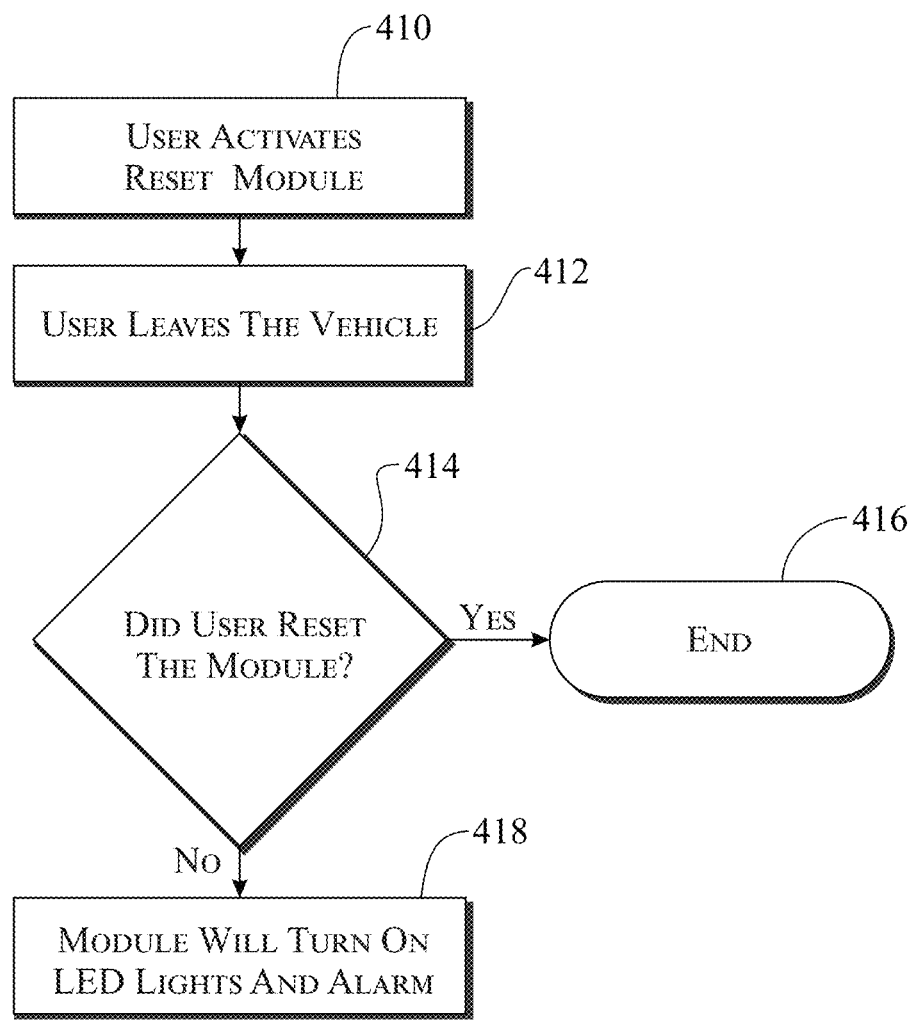
FIG. 13 presents a flow diagram describing the operation of the additional feature disclosed in FIG. 11.

Referring now to FIGS. 11-13, a feature is described that may be used in conjunction with the first and second embodiments. These figures depict a safety device that alarms the driver to check the back seat upon arrival at the destination. This feature helps ensure that passengers, such as children, are not left unattended in the rear area of the vehicle. For example, when the driver arrives at the destination and turns off the vehicle, an alarm in the car will go off if the driver does not press the reset button.

Referring to FIG. 11, a safety device 400 in the form of a controller is installed in the vehicle dash or console 402 and includes a reset button 404. Referring to FIG. 13, the safety device 400 is enabled when the user activates the reset module (410). The user then leaves the vehicle (412), which is sensed by the safety device 400. At a decision tree (414), if the user resets the module prior to exiting the vehicle, the alert procedure terminates (416). Otherwise, the module will turn on LED lights on the dash console and an alarm will sound (418), notifying the driver to check the back seat and then hit the reset key.

Referring to FIG. 12, an exemplary system 500 is shown to illustrate the circuitry for integrating the control of the first embodiment (FIGS. 1-6) and second embodiment (FIGS. 7-10), along with the safety feature set forth in FIGS. 11 and 13. A (car) battery 502 powers a printed circuit board 504 that makes electrical connections to the individual light-emitting devices located throughout the vehicle, at both the driver-side (left) and passenger-side (right). The driver-side includes light-emitting devices at the front headlight 506, side view mirror assembly 508, 510 (at both the front-facing exterior surface of the housing and the rear-facing mirror), and rear taillight 512. A similar set of locations is provided on the passenger-side (514, 516, 518, 520). The safety device 400 is implemented in the form of reset module 522 having various sound settings, a reset key, and an off selector. A controller 530 manages the operation of all of the components.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A signaling device for use with a vehicle, comprising:
   at least one light-emitting component each including a respective plurality of light sources that signal a U-turn; and
   at least one assembled installation defining a respective light-emitting component disposed at a respective,
      wherein the vehicle location includes a right and a left side view mirror assembly, and each assembly including a first light source disposed thereon,
      wherein the first light source includes a plurality of LEDs attached in a substantially circumferential pattern to a mirror of the right and left side view mirror assembly, the LEDs generally facing toward the vehicle's rear, and
      wherein a second light source is disposed on a mirror housing of the right and the left side view mirror assembly, the second light source generally facing toward the vehicle's front.

2. The signaling device of claim 1, wherein the plurality of light sources include a plurality of light-emitting diodes.

3. The signaling device of claim 2, wherein the plurality of light-emitting diodes are arranged in a daisy chain configuration.

4. The signaling device of claim 1, wherein the light-emitting component includes a first light source having a first set of light-emitting diodes (LEDs) and a second light source having a second set of light-emitting diodes (LEDs).

5. The signaling device of claim 1, wherein each of the plurality of light sources includes at least one strip having a first layer with an adhesive surface with a removable layer and a second layer opposite the adhesive surface disposed on the first layer carrying a set of LEDs.

6. The signaling device of claim 5, wherein the adhesive surface of the light source is irremovably adhered to one of a mirror and an exterior mirror housing surface of a right and left side new mirror assembly.

7. The signaling device of claim 1, further comprising a controller configured to selectively control operation of the light-emitting component.

8. The signaling device of claim 7, wherein the controller activates sequential illumination of the light sources to signal the U-turn.

9. The signaling device of claim 1, wherein the vehicle location may include one of a right and left side view assembly.

10. A signaling device for use with a vehicle; comprising:
 a first light-emitting component including a respective first light source;
 a second light-emitting component including a respective second light source; and
 an assembled installation defining the first light-emitting component and the second light-emitting component disposed at respective vehicle locations,
  wherein the vehicle location includes a right and left side view mirror assembly, and the first light source disposed on a mirror of the right and left side view mirror facing the vehicles rear, and the second light source disposed on a mirror housing of the right and left side view mirror facing the vehicle's front.

11. The signaling device of claim 10, wherein the vehicle location includes a front headlight assembly having the first light-emitting component disposed thereon and a tail light assembly having the second light-emitting component disposed thereon.

12. The signaling device of claim 10, wherein the first light source includes a plurality of LEDs attached in a substantially circumferential pattern to each of the mirrors of the right and left side view mirror assembly, and the second light source includes a plurality of LEDs attached to an exterior surface of the mirror housing in a pattern substantially similar to the circumferential pattern of the first light source.

13. The signaling device of claim 12, wherein the first light source and the second light source each include at least one strip having a first layer with an adhesive surface and a second layer opposite the adhesive surface disposed on the first layer carrying the LEDs, the adhesive surface of the first light source adhered to the mirror and the adhesive surface of the second light source adhered to the housing mirror of the left and right side view mirror assembly.

14. The signaling device of claim 10, wherein the first light-emitting component and the second light-emitting component are integrally formed at the vehicle location.

15. The signaling device of claim 10, wherein the first light-emitting component and the second light-emitting component is integrally formed to the right and left side view mirror assembly.

16. A signaling device system for use with a vehicle, comprising:
 a first light-emitting component including a first and a second light source each having a plurality of light-emitting diodes arranged in a daisy chain configuration, the first light source is disposed on a mirror of the left and right side view mirror assembly facing the vehicle's rear, and the second light source is disposed on an exterior surface of a housing mirror of the left and right side view mirror assembly;
 a second light-emitting component including a respective light source having a plurality of light-emitting diodes arranged in a daisy chain configuration, the light source of the second light-emitting component disposed on a front set of headlights,
 a third light-emitting component including a respective light source having a plurality of light-emitting diodes arranged in a daisy chain configuration, the light source of the third light-emitting component disposed on a rear set of tail lights; and
 a controller configured to selectively control operational use of all of the light-emitting components,
  wherein the controller activates sequential illumination of all of the light sources simultaneously to signal a U-turn.

17. A signaling device for use with a vehicle, comprising:
 a first light-emitting component including a respective first light source;
 a second light-emitting component including a respective second light source; and an assembled installation defining the first light-emitting component and the second light-emitting component disposed at respective vehicle locations,
  wherein the first light source includes a plurality of LEDs attached in a substantially circumferential pattern to each of the mirrors of the right and left side view mirror assembly, and the second light source includes a plurality of LEDs attached to an exterior surface of the mirror housing in a pattern substantially similar to the circumferential pattern of the first light source.

18. The signaling device of claim 17, wherein the first light source and the second light source each include at least one strip having a first layer with an adhesive surface and a second layer opposite the adhesive surface disposed on the first layer carrying the LEDs, the adhesive surface of the first light source adhered to the mirror and the adhesive surface of the second light source adhered to the housing mirror of the left and right side view mirror assembly.

* * * * *